April 1, 1952 R. H. GEORGE 2,591,348
WHEEL CHOCK
Filed March 7, 1949

Inventor
RAMON H. GEORGE

By J. B. Dickman, Jr.
Attorney

Patented Apr. 1, 1952

2,591,348

UNITED STATES PATENT OFFICE 2,591,348

WHEEL CHOCK

Ramon H. George, Baltimore, Md.

Application March 7, 1949, Serial No. 79,960

2 Claims. (Cl. 188—32)

The present invention relates to a wheel chock for automobiles, tractors and the like.

It is a common practice of owners of vehicles using pneumatic tires to look for a stone or brick, or some other object to place under one of the rear wheels of a vehicle when a tire goes flat, to prevent the vehicle from moving when being jacked up to replace the flat tire. If the vehicle is on a hill there is danger of the vehicle moving whatever is placed under the wheel such as a stone or brick due to the motion of jacking the vehicle up.

It is therefore an object of the present invention to provide a wheel chock for vehicles that is safe and one that will prevent a vehicle from moving when placed in position.

Another object of the present invention is the provision of a vehicle chock having means for engagement with a surface.

A still further object of the present invention is the provision of a vehicle chock having a slidable wheel engaging means.

A still further object of the present invention is the provision of a fixed wheel engaging means.

Other and further objects and advantages of the invention will be apparent from the following description when taken in connection with the accompanying drawing, wherein.

Figure 1:
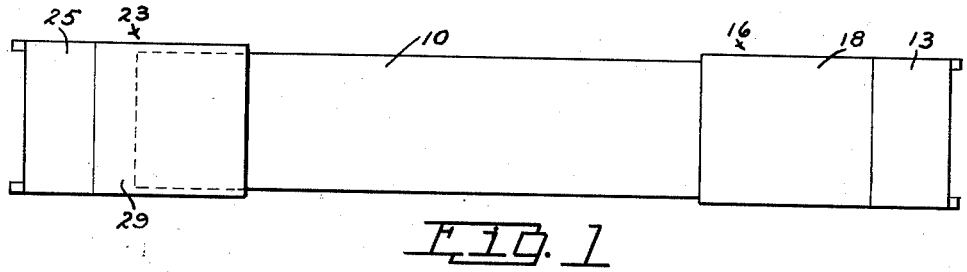
Figure 1 is a top plan view of my wheel chock assembly.
Figure 2:
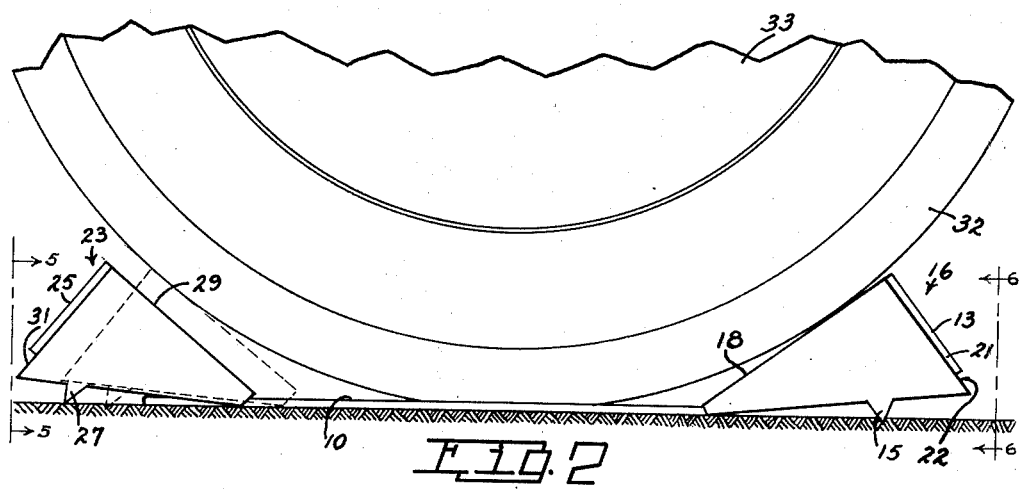
Figure 2 is a side elevational view of the chock assembly and illustrating a wheel positioned therein, the gripping means being shown embedded in a surface, the dotted line illustrating a slidable chock moved into position to a wheel.
Figures 5, 6:
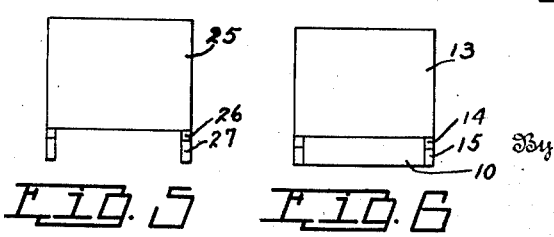
Figure 5 is an end elevational view on line 5—5 of Figure 2 looking in the direction of the arrows.
Figure 6 is an end elevational view on line 6—6 of Figure 2 looking in the direction of the arrows.

In the drawings the numeral 10 represents a bed plate of suitable metal, one end 11 having legs 12 and a plate 13. The edges 14 of the legs 12 are disposed at an angle to the bed plate 10, each edge being provided with a spur 15. The chock 16 is formed by bending upwardly on the dotted line 17 so that the face 18 of the chock is disposed at an angle to the bed plate 10 as shown in Figure 2. The legs 12 are each bent downwardly on the dotted lines 19 until each is disposed at right angles to the face 18. Next the end plate 13 is bent downwardly on the dotted line 20, the side edges 21 may be positioned between the legs 12 or inner face of the plate may impinge the edges 22 of the legs as shown in Figures 2 and 6.

Figures 3, 4:
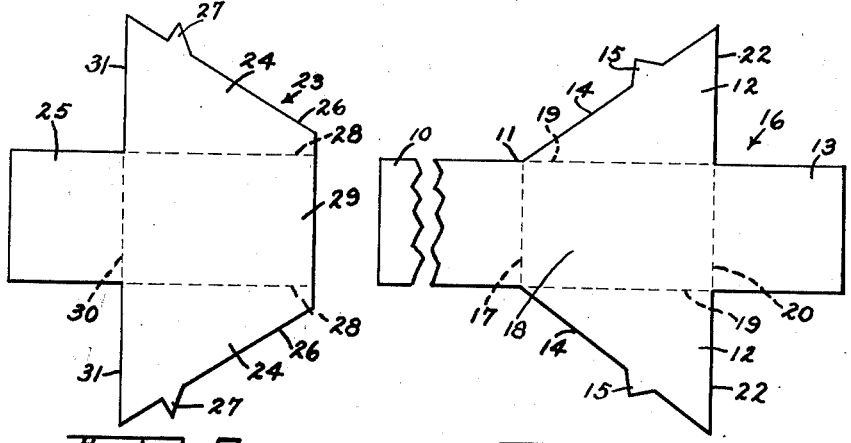
Figure 3 is a top plan view of a slidable wheel chock before being formed.
Figure 4 is a top plan view of the chock that is integral with a bed plate before being formed, the bed plate being shown broken.

The chock 23 is formed from a blank as shown in Figure 3, the blank comprising legs 24 and a plate portion 25, the side edges 26 of the legs 24 each being provided with spurs 27, the edges being disposed at an angle. Chock 23 is formed by bending the legs 24 downwardly on the dotted lines 28 until the legs are at right angles to the face 29. The plate portion 25 is bent downwardly on dotted line 30 until it is at right angles to the face 29, and this plate may be impinged between the legs 24, or the inner face of the plate may impinge the side edges 31 of legs 24 as shown in Figures 2 and 5, the transverse width of the chock 29 being slightly wider than the bed plate 10 permitting free slidable movement of the chock toward and away from a vehicle wheel.

In the use of the device the bed plate 10 with the chock 16 is placed on the ground in front of the good rear wheel of a vehicle, the vehicle is then moved forward until the wheel tire 32 of a vehicle wheel 33 impinges the face 18 of the chock 16, the impact of the tire 32 with the face 18 of the chock forcing the spur 15 into the ground. The chock 23 is then guided onto the bed plate 10, and as shown by the dotted lines it is moved forward until the face 29 engages the tire 32. As the car is jacked up, the additional weight placed on the tire 32 and wheel 33 will force the spurs 15 and 27 deeper into the ground, thus securing the chocks against casual displacement. When the flat tire has been replaced by a good tire, the chock 29 is removed, the vehicle moved off of the bed plate and the assembly then stored into the vehicle.

While the present invention has been disclosed in connection with certain specific embodiments, it is to be understood that these are by way of example rather than by way of limitation and that the invention is to be defined by the attendant claims which should be given a scope as broad as is consistent with the prior art.

What is claimed is:

1. A wheel chock assembly comprising an elongated bed plate a portion of which is adapted for engagement with a vehicle wheel, said bed plate bent upwardly adjacent one end, triangular wings on the portion of the bed plate bent upwardly, said triangular wings being bent downwardly, a spur on the longest edge of each triangular wing for ground engagement, said spurs being adjacent the base of the triangular wings, a slidable chock on the opposite end of said bed plate having triangular shaped wings bent downwardly, a spur on the longest edge of each triangular wing, said spurs being adjacent the base of the triangular wings.

2. A wheel chock assembly comprising an elongated wheel supporting member, an integral chock on one end of said elongated member, said chock comprising an upturned horizontal portion, vertically depending sides on said upturned horizontal portion, said sides having spurs on their bottom edges, and a slidable chock on the other end of said wheel supporting member, said slidable chock having downwardly turned wings and spurs on the lower edges of said downwardly turned wings.

RAMON H. GEORGE.

REFERENCES CITED

The following references are of record in the file of this patent:

UNITED STATES PATENTS

| Number | Name | Date |
| --- | --- | --- |
| 833,454 | Flemming | Oct. 16, 1906 |
| 1,261,681 | Barnett | Apr. 2, 1918 |
| 1,544,372 | Campbell | June 30, 1925 |
| 2,189,323 | Noonan | Feb. 6, 1940 |
| 2,442,501 | Mast et al. | June 1, 1948 |

FOREIGN PATENTS

| Number | Country | Date |
| --- | --- | --- |
| 205,522 | England | Oct. 18, 1923 |